2,708,162
Patented May 10, 1955

2,708,162

URAZOLE STABILIZER FOR EMULSIONS SENSITIZED WITH ALKYLENE OXIDE POLYMERS

Burt H. Carroll and Norman F. Beach, Rochester, N. Y., assignors to Eastman Kodak Company, Rochester, N. Y., a corporation of New Jersey No Drawing. Application April 29, 1954,
Serial No. 426,546

13 Claims. (Cl. 95—7)

This invention relates to fog inhibiting agents and stabilizers for photographic emulsions and to photographic emulsions containing them.

It is well known that photographic emulsions on storage tend to lose sensitivity and to become spontaneously developable without exposure to light. There is normally a detectable amount of the silver salt reduced during development in the areas where no exposure was given; this is commonly called "fog," and sometimes called "chemical fog" where it is necessary to distinguish between it and the effects of accidental exposure to radiation; in this invention, we are not concerned with the latter.

Fog depends both on the emulsion and the conditions of development; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

It is known that the effective sensitivity of photographic silver halide emulsions may be increased by adding to them derivatives of alkylene oxides such as ethylene oxide polymers having molecular weights of 300 or more. The practical value of these compounds is severely limited by their tendency to increase fog on storage of the photographic film, especially storage at elevated temperatures and humidities. It has been found difficult to control this by the antifoggants commonly available without using quantities of antifoggant which partly neutralize the speed increase obtained from the alkylene oxide derivatives.

It is therefore an object of the present invention to provide a method for stabilizing photographic emulsions sensitized with alkylene oxide derivatives such as polyethylene oxides. A further object is to provide a means for reducing the fog produced upon keeping of emulsions so sensitized, especially emulsions stored under tropical or other adverse conditions. A still further object is to provide a means for stabilizing the speed and contrast of emulsions so sensitized. Other objects will appear from the following description of our invention.

These objects are accomplished in general by adding to the emulsion sensitized with alkylene oxide polymers, urazole as a stabilizing and fog inhibiting agent.

The alkylene oxide polymers used to sensitize the emulsions may be of various types. The alkylene oxide from which the polymers are derived contain from 2 to 4 carbon atoms, e. g., ethylene oxide, propylene oxide and butylene oxide. The preparation of polymers from these compounds is described in Ellis, The Chemistry of Synthetic Resins (1935), pages 990 to 994. These compounds are also referred to as polyalkylene glycols and their use as sensitizers for silver halide emulsions is described in U. S. Patents 2,423,549 and 2,441,389.

Various derivatives of alkylene oxides may also be used to sensitize the silver halide emulsions, e. g., condensation products of alkylene oxide with glycols, such as those having from 8 to 18 carbon atoms as described in U. S. Patent 2,240,472 and British Patent 443,559, as well as condensation products of alkylene oxides with aliphatic alcohols, aliphatic acids and aliphatic amines, that is, polyalkylene ethers, esters and amides, the preparation of which is described in U. S. Patent 1,970,578, condensation products of alkylene oxides with phenols, also described in U. S. Patent 1,970,578, and condensation products of alkylene oxides with hexitol ring dehydration products, as described in U. S. Patent 2,400,532.

In each case the polyalkylene oxide or derivative of alkylene oxide should have a molecular weight of at least 300. Condensation products of ethylene oxide with long chain alcohols should have a molecular weight of about 700; other derivatives may have a molecular weight of 1500 to 4000 or more.

Urazole has the following structure:

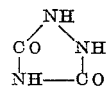

The principal purpose of our invention is to provide means for maintaining the sensitivity and fog of silver halide emulsions at or close to initial optimum values under conditions of high temperature or high humidity, or both. Preferably, the fog inhibitor which we propose to use is added to the emulsion at any stage during the process of manufacture prior to coating the emulsion. The urazole fog inhibitor may be added to the emulsion in solution in any convenient solvent not injurious to the emulsion such as lower alcohols.

An additional purpose of our invention is to provide an antifoggant which may be used with emulsions sensitized with alkylene oxide derivatives and hardened with specific hardening agents. While the antifoggant properties of urazole are known, this compound also has the undesirable property of reacting with aldehyde-type gelatin hardeners causing a detrimental effect on both the hardening and antifoggant action. We have found that when urazole is used with an emulsion hardened with alkylene bisesters of methane sulfonic acid such as disclosed in Allen and Laakso U. S. application Serial No. 259,511, filed December 1, 1951, no interference with the hardening action is caused by the urazole. A hardening agent of the class mentioned is 1,5-bis(methane sulfonoxy)-pentane.

A solution of the urazole which we employ when added in suitable concentration before coating to unsensitized or optically sensitized silver halide emulsions usually does not appreciably affect the sensitivity and fog when measurements are made soon after coating. However, when sensitometric measurements are made after appreciable intervals of time under tropical or dry conditions of storage at elevated temperatures this compound does stabilize speed and maintain fog at a low level.

The alkylene oxide derivatives used to sensitize the emulsions may be illustrated by the following specific examples, although our invention is in no way limited to the use of these specific compounds.

Polyethylene oxide

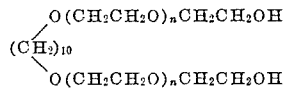

Di-(polyethylene-glycoxy)-decane

Polyethylene oxide oleyl ether where $n$ = an integer greater than about 10.

The preparation of silver halide emulsions involves three separate operations: (1) the emulsification and digestion or ripening of the silver halide, (2) the freeing of the emulsion from aqueous soluble salts usually by washing, (3) the second digestion or after-ripening to obtain increased sensitivity (Mees, The Theory of the Photographic Process, 1942, page 3). The fog inhibiting agents may be added at any stage, preferably after the final digestion.

The photographic emulsions which we use are of the developing-out type and best results have been obtained with gelatino-silver bromoiodide emulsions. However, emulsions of varying halide content may be used.

The emulsions may be chemically sensitized by any of the accepted procedures, in addition to or in combination with the sensitizing with alkylene oxide polymers. The emulsions may be digested with naturally active gelatin, or sulfur compounds may be added such as those described in Sheppard U. S. Patents 1,574,944 and 1,623,499, and Sheppard and Brigham U. S. Patent 2,410,689.

The emulsions may also be treated with salts of the noble metals such as ruthenium, rhodium, palladium, iridium and platinum, all of which belong to group VIII of the periodic table of elements and have an atomic weight greater than 100. Representative compounds are ammonium chloropalladate, potassium chloroplatinate and sodium chloropalladite, which are used for sensitizing in amounts below that which produces any substantial fog inhibition, as described in Smith and Trivelli U. S. Patent 2,448,060, and as antifoggants in higher amounts, as described in Trivelli and Smith U. S. Patents 2,566,245 and 2,566,263.

The emulsions may also be chemically sensitized with gold salts as described in Waller and Dodd U. S. Patent 2,399,083, or stabilized with gold salts as described in Damschroder U. S. Patent 2,597,856 and Yutzy and Leermakers U. S. Patent 2,597,915. Suitable compounds are potassium chloroaurite, potassium aurithiocyanate, potassium chloroaurate, auric trichloride and 2-aurosulfobenzothiazole methochloride.

The emulsions may also be chemically sensitized with reducing agents such as stannous salts (Carroll U. S. Patent 2,487,850), polyamines such as diethylene triamine (Lowe and Jones U. S. Patent 2,518,698), polyamines such as spermine (Lowe and Allen U. S. Patent 2,521,925), or bis-(β-aminoethyl) sulfide and its water-soluble salts (Lowe and Jones U. S. Patent 2,521,926).

The emulsions may also be stabilized with the mercury compounds of Allen, Byers and Murray U. S. application Serial No. 319,611, Carroll and Murray U. S. application Serial No. 319,612 and Leubner and Murray U. S. application Serial No. 319,613, all filed November 8, 1952.

The sensitizing and stabilizing combinations of polyalkylene oxides and urazole are effective in the presence or absence of optical sensitizing dyes. Since optical sensitizing may affect stability of emulsions with respect to sensitivity, fog and latent image changes, the action of urazole is not completely independent of optical sensitizing or other emulsion variables. We have found, however, that both unsensitized emulsions and emulsions sensitized with cyanine or merocyanine dyes or both may be treated with polyalkylene oxides and urazole according to our invention.

The most useful concentration of urazole in the emulsion is from 0.1 to 5 grams per gram mole of silver halide in the emulsion. Optimum concentrations are about 1.5 to 3.5 grams of urazole per gram mole of silver halide. These amounts may be used in combination with one or more of the chemical sensitizing and stabilizing agents listed above.

The stabilizing action was determined by incubation of the emulsions for a period from 1 to 4 weeks at 100° to 120° F. and constant humidity. Speeds were measured in terms of 3C/E where E is the exposure required to produce a density of 0.2 above fog. The results of aging tests are tabulated in the examples below and compare speed, gamma and fog of the emulsions with and without the stabilizing compound.

*Example 1*

A negative-speed gelatino-silver bromoiodide emulsion containing 0.24 mol of silver halide per liter was digested with a sulfur compound such as disclosed in Sheppard U. S. Patent 1,574,944 and potassium chloroaurate and chemically sensitized with about 0.44 gram per gram mol of silver halide, of polyethylene oxide oleyl ether. To a portion of the emulsion there was added 3.5 grams of urazole per gram mole of silver halide. Preferably the pH of the emulsion is adjusted to pH 6 or below. Portions of the emulsion with and without the urazole were coated on a cellulose acetate film support, exposed on an Eastman type Ib Sensitometer and developed for 6½ minutes at 68° F. in a developer of the following formula:

| | Grams |
|---|---|
| N-methyl-p-aminophenolsulfate | 1.5 |
| Hydroquinone | 1.3 |
| Sodium sulfite (desiccated) | 75 |
| Borax | 4.5 |
| Potassium bromide | 0.4 |
| Water to 1 liter. | |

Portions of the films with and without the urazole were held for one week at 120° F. and for 12 months at 78° F. and constant humidity and were then exposed and developed as indicated. The results of tests for speed, gamma and fog, before and after incubation of each of the samples, were as follows:

| Compound | Agent per mole, gm. | Fresh Test | | | After Incubation | | |
|---|---|---|---|---|---|---|---|
| | | Speed | Gamma | Fog | Speed | Gamma | Fog |
| Control | | 4,850 | 0.69 | .03 | [1] 4,350 | [1] 0.68 | [1] .09 |
| Urazole | 3.5 | 5,350 | 0.70 | .01 | [1] 5,450 | [1] 0.69 | [1] .05 |
| Control | | 4,150 | 0.74 | .03 | [2] 3,300 | [2] 0.65 | [2] .15 |
| Urazole | 3.5 | 4,250 | 0.71 | .03 | [2] 4,250 | [2] 0.74 | [2] .08 |

[1] 1 week at 120° F.
[2] 12 mos. at 78° F.

*Example 2*

A negative-speed gelatino-silver bromoiodide emulsion was chemically sensitized with sulfur and gold compounds as in Example 1 and was panchromatically sensitized with cyanine dyes. To a portion of the emulsion there was added 0.3 gram per gram mole of silver halide of the oleyl ether of polyethylene oxide and to separate portions of the emulsion containing this sensitizer there were added 1.5 grams per gram mole of silver halide of urazole and 3.0 grams per gram mole of silver halide of urazole.

The emulsions were coated on film base and were exposed and developed as in Example 1. The films with and without the various addenda were held at 100° F. and constant humidity for one week and were then exposed and developed as in Example 1, the results of tests for speed, gamma and fog being as follows:

| Compound | Agent per mole, gm. | Fresh Test | | | After Incubation | | |
|---|---|---|---|---|---|---|---|
| | | Speed | Gamma | Fog | Speed | Gamma | Fog |
| Control | | 6,250 | 0.72 | .08 | 6,700 | 0.64 | .11 |
| Polyethylene oxide oleyl ether (I) | .30 | 9,900 | 0.82 | .10 | 11,400 | 0.70 | .15 |
| I | .30 | } 9,500 | 0.77 | .10 | 10,400 | 0.66 | .13 |
| Urazole | 1.5 | | | | | | |
| I | .30 | } 9,050 | 0.86 | .09 | 10,400 | 0.75 | .11 |
| Urazole | 3.0 | | | | | | |

*Example 3*

A negative-speed gelatino-silver bromoiodide emulsion chemically sensitized with sulfur and gold compounds and panchromatically sensitized as in Example 2 was chemically sensitized with 0.3 gram per gram mole of silver halide of the oleyl ether of polyethylene oxide. To portions of the emulsion sensitized in this way there were added 1.5 grams per gram mole of silver halide of urazole, 3.0 grams per gram mole of silver halide of urazole and both 3.0 grams of urazole and 3.0 grams of 1,5-bis(methanesulfonoxy)pentane per gram mole of silver halide.

The emulsions were coated on film base and were exposed and developed as in Example 1. The films with and without the various addenda were held at 120° F. and constant humidity for one week and were then exposed and developed as in Example 1, the results of tests for speed, gamma and fog being as follows:

| Compound | Agent per mole, gm. | Fresh Test | | | After Incubation | | |
|---|---|---|---|---|---|---|---|
| | | Speed | Gamma | Fog | Speed | Gamma | Fog |
| Control | | 3,600 | 0.55 | .07 | 570 | 0.46 | .45 |
| Polyethylene oxide oleyl ether (I) | .30 | 6,550 | 0.55 | .09 | 2,700 | 0.49 | .32 |
| I | .30 | } 6,150 | 0.59 | .09 | 3,500 | 0.58 | .24 |
| Urazole | 1.5 | | | | | | |
| I | .30 | } 6,400 | 0.55 | .08 | 3,700 | 0.57 | .22 |
| Urazole | 3.0 | | | | | | |
| I | .30 | } 6,150 | 0.55 | .08 | 3,500 | 0.55 | .22 |
| Urazole | 3.0 | | | | | | |
| 1,5-Bis-(methanesulfonoxy)-pentane | 3.0 | | | | | | |

Instead of incorporation in the silver halide emulsion, the fog inhibitor of our invention may be incorporated in a colloid layer such as a gelatin overcoating layer or interlayer in contact with the emulsion.

The fog-inhibiting agents which we have described may be used in various kinds of photographic emulsions. In addition to being useful in non-sensitized emulsions they may also be used in orthochromatic, panchromatic and X-ray emulsions. If used with sensitizing dyes, they may be added to the emulsion before or after the dyes are added. Various silver salts may be used as the sensitive salt, such as silver bromide, silver iodide, silver chloride or mixed silver halides. The urazole and alkylene oxide polymers may be used in emulsions intended for color photography, for example, emulsions containing color-forming couplers, or emulsions to be developed by solutions containing couplers.

The polyethylene oxide polymers used in the emulsions according to our invention may be prepared either by polymerizing ethylene oxide in the presence of aliphatic acids, aliphatic amines or phenols, or by reacting the polymerized polyethylene oxide with aliphatic acids, acid chlorides, or esters, which produces similar products.

The dispersing agents may be gelatin or other colloid such as collodion, albumen, cellulose derivatives or synthetic resins.

It will be understood that we contemplate as included within our invention all modifications and equivalents falling within the scope of the appended claims.

We claim:
1. A light-sensitive silver halide emulsion sensitized with an alkylene oxide polymer selected from the class consisting of (1) polyalkylene glycols, (2) condensation products of alkylene oxide with glycols, (3) condensation products of alkylene oxide with aliphatic compounds selected from the class consisting of alcohols, acids and amines, (4) condensation products of alkylene oxide with phenols, and (5) condensation products of alkylene oxide with hexitol ring dehydration products, said alkylene oxide containing from 2 to 4 carbon atoms and said alkylene oxide polymer having a molecular weight of at least 300, said emulsion containing urazole as a fog inhibiting agent.

2. A light-sensitive silver halide emulsion sensitized with an ethylene oxide polymer having a molecular weight of at least 300, said emulsion containing urazole as a fog inhibiting agent.

3. A light-sensitive silver halide emulsion sensitized with a condensation product of ethylene oxide with an aliphatic alcohol, said condensation product having a molecular weight of at least 300, and said emulsion containing urazole as a fog inhibiting agent.

4. A light-sensitive silver halide emulsion sensitized with a condensation product of ethylene oxide with an aliphatic acid, said condensation product having a molecular weight of at least 300, and said emulsion containing urazole as a fog inhibiting agent.

5. A light-sensitive silver halide emulsion sensitized with a condensation product of ethylene oxide with an aliphatic amine, said condensation product having a molecular weight of at least 300, and said emulsion containing urazole as a fog inhibiting agent.

6. A light-sensitive silver halide emulsion sensitized with a condensation product of one mole of oleyl alcohol with approximately 15 moles of ethylene oxide, said emulsion containing urazole as a fog inhibiting agent.

7. A light-sensitive sulfur-sensitized silver halide emulsion additionally sensitized with an alkylene oxide polymer selected from the class consisting of (1) polyalkylene glycols, (2) condensation products of alkylene oxide with glycols, (3) condensation products of alkylene oxide with aliphatic compounds selected from the class consisting of alcohols, acids and amines, (4) condensation products of alkylene oxide with phenols, and (5) condensation products of alkylene oxide with hexitol ring dehydration products, said alkylene oxide containing from 2 to 4 carbon atoms and said alkylene oxide polymer having a molecular weight of at least 300, said emulsion containing urazole as a fog inhibiting agent.

8. A light-sensitive sulfur-sensitized silver halide emulsion additionally sensitized with an ethylene oxide polymer having a molecular weight of at least 300, said emulsion containing urazole as a fog inhibiting agent.

9. A light-sensitize sulfur-sensitized silver halide emulsion additionally sensitized with a condensation product of one mole of oleyl alcohol with approximately 15 moles of ethylene oxide, said emulsion containing urazole as a fog inhibiting agent.

10. The emulsion of claim 7 which is additionally chemically sensitized with gold salts.

11. The emulsion of claim 8 which is additionally chemically sensitized with gold salts.

12. A light-sensitive gelatino-silver halide emulsion hardened with an alkylene bis ester of methane sulfonic acid and sensitized with an alkylene oxide polymer selected from the class consisting of (1) polyalkylene glycols, (2) condensation products of alkylene oxide with glycols, (3) condensation products of alkylene oxide with aliphatic compounds selected from the class consisting of alcohols, acids and amines, (4) condensation products of alkylene oxide with phenols, and (5) condensation products of alkylene oxide with hexitol ring dehydration products, said alkylene oxide containing from 2 to 4 carbon atoms and said alkylene oxide polymer having a molecular weight of at least 300, said emulsion containing urazole as a fog inhibiting agent.

13. A light-sensitive gelatino-silver halide emulsion hardened with 1,5-bis-(methanesulfonoxy)-pentane and sensitized with a condensation product of one mole of oleyl alcohol with approximately 15 moles of ethylene oxide, said emulsion containing urazole as a fog inhibiting agent.

No references cited.